Dec. 10, 1968
F. J. WALKER
3,415,578
VEHICLE BRAKING SYSTEMS
Filed April 11, 1967
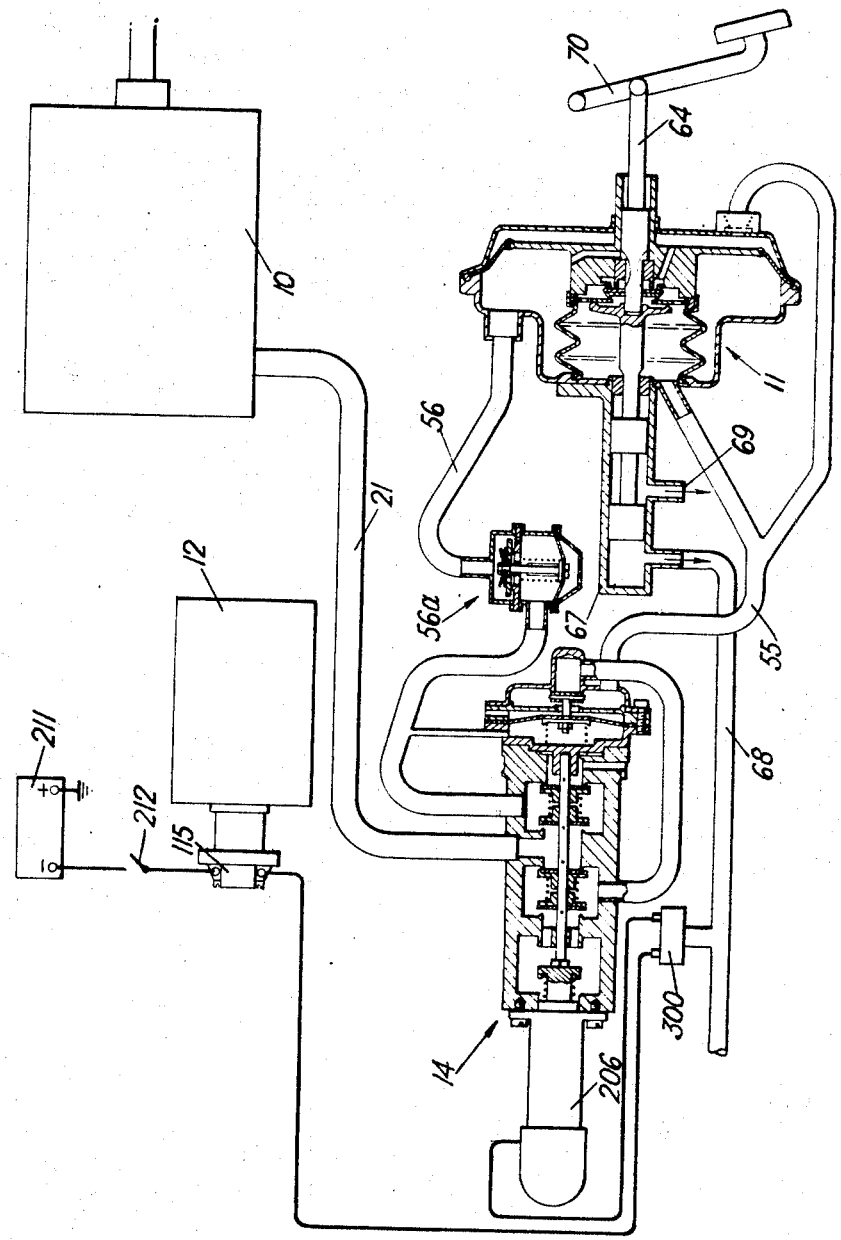
Inventor
FREDERICK J. WALKER
By
Mason, Fenwick & Lawrence
Attorneys

3,415,578
VEHICLE BRAKING SYSTEMS

Frederick J. Walker, Kenilworth, England, assignor to Harry Ferguson Research Ltd., Abbotswood, Stow-on-the-Wold, Gloucestershire, Great Britain
Filed Apr. 11, 1967, Ser. No. 630,085
Claims priority, application Great Britain, Apr. 15, 1966, 16,556/66
5 Claims. (Cl. 303—21)

The invention relates to vehicles and to braking systems therefor.

In co-pending application No. 612,053 there are disclosed vehicle braking systems including inertia operated anti-skid means responsive on excessive deceleration of the vehicle transmission to release the wheel brakes.

It is an object of the present invention to prevent undesirable operation of said anti-skid means when the brakes are not applied.

According to the invention there is provided a vehicle having a servo-assisted braking system, an anti-skid device operable in response to inertia changes, and valve means interposed in the servo-system and operatively connected to said anti-skid device whereby on operation of the latter said valve means is operated to sequentially reduce, remove and reverse the servo-assistance to decrease the braking effect, said anti-skid device and said valve means being operatively interconnected by a circuit incorporating a circuit breaker device operatively connected to means for applying the brakes to close the circuit-breaker device when the brakes are applied.

Preferably, said circuit-breaker device is a pressure-actuated switch connected in electric circuit between said anti-skid device and said valve means and operated by the pressure of hydraulic fluid in the braking system to complete the electric circuit.

Alternatively, the circuit breaker device may be a valve interposed in a fluid circuit between said anti-skid device and said valve means and operated by pressure of hydraulic fluid in the braking system to complete the fluid circuit.

Alternatively the circuit breaker device may be directly mechanically coupled to a mechanical element of the means for applying the brakes.

An embodiment of the invention will now be described, by way of example only, with reference to the accompanying drawing which shows a braking system similar to that shown in FIG. 2 of application No. 612,053, but including in addition a pressure differential responsive valve 56a as described in my co-pending application No. 612,053 and a sensing device according to the present invention.

Referring to the drawing, the braking system includes vacuum servo-assisted brake-applying means 11, a change-over valve 14, a vacuum tank 10 and an anti-skid device 12 operable in response to changes in rotary inertia of a component of the vehicle transmission. Other parts are shown by reference numerals similar to those used in application No. 612,053.

The change-over valve 14 is operated by solenoid 206 connected in circuit with switch 115 operable by the anti-skid device 12. Also in circuit is a circuit breaker device in the form of a pressure switch 300 interposed between the switch 115 and the solenoid and in communication with fluid in the brake pipe 68.

When the brakes are applied the hydraulic fluid in the pipe 68 is pressurized thus closing the pressure switch 300. The circuit from the switch 115 to the solenoid is thus closed and if excessive braking takes place the anti-skid device 12 operates the switch 115 to close the circuit from the battery 211 to the solenoid, thus operating the change-over valve 14 to decrease the braking effect as described in application No. 612,053.

When the brakes are not applied, severe transmission jerks can arise, such as when changing gear, and this might be sufficient to operate the anti-skid device 12. If the pressure switch 300 were not present this would cause operation of the solenoid, change-over valve and servo-mechanism with consequent unnecessary wear and tear of the various moving parts. However, by virtue of the presence of the pressure switch 300, the circuit from the switch 115 to the solenoid is not completed because there is insufficient hydraulic pressure in the pipe 68 to close the pressure switch 300.

Thus only when the brakes are actually applied is operation of the anti-skid device effective to decrease the braking effect.

Various modifications are possible. For example the circuit breaker device could take the form of a valve interposed in a pneumatic or hydraulic circuit between the anti-skid device and the change-over valve, for example in the pipe 102 in FIG. 1 of application No. 612,053, the valve being operated by pressure in the static braking system. In other modifications the circuit breaker device could be directly mechanically coupled to the brake pedal 70 or rod 64 to sense movement thereof instead of pressure changes in the static braking system, or could be mounted on the master cylinder 67 in communication with the fluid therein. Moreover the circuit breaker device could be connected to the pipe 69 instead of the pipe 68.

What is claimed is:

1. A vehicle having a servo-assisted braking system, an anti-skid device operable in response to inertia changes, and valve means interposed in the servo-system and operatively connected to said anti-skid device whereby on operation of the latter said valve means is operated to sequentially reduce, remove and reverse the servo-assistance to decrease the braking effect, said anti-skid device and said valve means being operatively interconnected by a circuit incorporating a circuit breaker device operatively connected to means for applying the brakes to close the circuit-breaker device when the brakes are applied.

2. A vehicle according to claim 1 in which said circuit breaker device is operable in accordance with variations in the pressure of hydraulic fluid in the braking system.

3. A vehicle according to claim 2 in which said circuit is an electric circuit and said circuit breaker device is a switch operated by the pressure of hydraulic fluid in the braking system.

4. A vehicle according to claim 2 in which said circuit is a fluid circuit and said circuit breaker device is a valve operated by the pressure of hydraulic fluid in the braking system.

5. A vehicle according to claim 1 in which said circuit breaker device is directly mechanically coupled to a mechanical element of the means for applying the brakes.

References Cited
UNITED STATES PATENTS

| 3,004,801 | 10/1961 | Wrigley | 303—21 |
| 3,093,422 | 6/1963 | Packer et al. | 303—21 |
| 3,265,446 | 8/1966 | Cripe | 303—21 |

DUANE A. REGER, *Primary Examiner.*

U.S. Cl. X.R.
188—181